United States Patent [19]

Masumoto et al.

[11] Patent Number: 5,198,042

[45] Date of Patent: Mar. 30, 1993

[54] ALUMINUM ALLOY POWDERS FOR COATING MATERIALS, AND COATING MATERIALS CONTAINING THE ALLOY POWDERS

[75] Inventors: Tsuyoshi Masumoto, 8-22, Uesugi 3-chome, Aoba-ku, Sendai-shi, Miyagi-ken, Japan; Akihisa Inoue; Kazuhiko Kita, both of Sendai; Yoshio Harakawa; Masahiro Oguchi, both of Tokyo, all of Japan

[73] Assignees: Tsuyoshi Masumoto, Sendai; Yoshida Kogyo K.K., Miyagi; Teikoku Piston Ring Co., Ltd., Tokyo, all of Japan

[21] Appl. No.: 791,572

[22] Filed: Nov. 12, 1991

[30] Foreign Application Priority Data

Nov. 16, 1990 [JP] Japan ................. 2-310935

[51] Int. Cl.$^5$ ............................................. C22C 45/08
[52] U.S. Cl. ..................................... 148/403; 420/550; 428/328
[58] Field of Search ............. 428/328, 413, 423.1, 428/480, 614; 420/550; 148/403

[56] References Cited

U.S. PATENT DOCUMENTS

| 4,595,429 | 6/1986 | LaCaér et al. ............ 148/403 |
| 4,606,967 | 8/1986 | Mosser .................... 428/328 |
| 4,710,246 | 12/1987 | LeCaér et al. ............ 148/403 |
| 4,749,625 | 6/1988 | Obayashi et al. .......... 148/403 |
| 4,891,068 | 1/1990 | Masumoto et al. ......... 148/403 |
| 5,013,346 | 5/1991 | Masumoto et al. ......... 65/21.2 |

FOREIGN PATENT DOCUMENTS 0100287 2/1984 European Pat. Off. .
0345921 12/1989 European Pat. Off. .
59-20042 2/1984 Japan .

Primary Examiner—George Wyszomierski
Attorney, Agent, or Firm—Frishauf, Holtz, Goodman & Woodward

[57] ABSTRACT

An aluminum alloy powder for coating materials and a coating material containing the aluminum alloy powder. The aluminum alloy powder comprises an amorphous aluminum alloy consisting essentially of from 83 to 91% of Al, from 0.5 to 5% of Ca and from 8 to 12% of Ni, all in atom %, and comprising a leaf-shaped particle having a thickness of 0.3 to 3 μm, a minor axis of from 10 to 150 μm, a ratio of the minor axis to a major axis of from 1 to 3, and an aspect ratio which is the ratio of the minor axis to the thickness of from 3 to 100, wherein the aluminum alloy powder is contained in an amount of from 5 to 25 parts by weight based on 100 parts by weight of the total weight of (i) the coating material resin component and (ii) aluminum alloy powder, and the coating material resin component is selected from the group consisting of a water-based synthetic latex and a water-soluble resin. The aluminum alloy powder has a superior dispersibility in a resin in a coating material. When added to a coating material and then coated, the aluminum alloy powder can bring about leafing in a desirable state, so that the coating surface can be effectively covered with the powder. The aluminum alloy powder can impart better hiding power and reflecting properties, even when added in a smaller quantity than conventional powders. Since the aluminum alloy powder is comprised of an amorphous alloy, it does not cause deterioration of reflecting properties, even when used in coating materials containing water-soluble solvents.

20 Claims, 1 Drawing Sheet

ALUMINUM ALLOY POWDERS FOR COATING MATERIALS, AND COATING MATERIALS CONTAINING THE ALLOY POWDERS

BACKGROUND OF THE INVENTION

The present invention relates to an aluminum alloy powder suited particularly as a pigment for design coating materials, and also relates to a coating material containing this alloy powder.

Aluminum (Al) powder has been hitherto used as a pigment for coating materials for the purpose of, e.g., preventing corrosion, providing decorative coatings, or reflecting heat radiations. Such coating materials are used in the coating of automobiles, tanks, steel frames or skeletons, roofs, etc. This Al powder is comprised of leaf-shaped particles. When the powder is mixed in a resin material and the mixture is coated by brushing or spraying, the Al powder particles are laid overlapping in parallel with the coating layer owing to the surface tension produced in the curing of the resin (i.e., a leafing phenomenon) to form a continuous film comprised of the powder, thus making it possible to protect materials from the air to impart good corrosion resistance, or utilize the reflecting properties of Al powder to impart decorative appearance and weatherability.

Conventional Al powders are prepared by making granular powder from an Al melt by air atomizing or inert gas atomizing, pulverizing the resulting powder in a ball mill together with stearic acid or oleic acid to make it into a fine powder and at the same time stretch it using a shear force to have a flat particle shape. The powder thus obtained, however, is known to show poor reflecting properties when used in a coating material, because it tends to have rough particle surfaces and hence tends to have an irregular shape in its particle peripheries.

Meanwhile, in recent years, regulations for protecting the environment of the globe have been more tightened, and coating materials also have a tendency that those making use of organic solvents are replaced by water-based coating materials. This brings about the problem that, when water is used as a solvent, Al powder undergoes corrosion of particle surfaces to cause a deterioration of the reflecting properties. For this reason, Al powders whose particle surfaces are coated with phenol resin have been put into use, but still can not avoid causing a lowering of the reflecting properties because of the coating with resin.

The present applicants have already proposed a method of preparing an aluminum alloy powder having an amorphous phase or an amorphous and finely crystalline mixed phase, comprising forcing a melt of an aluminum alloy to flow out from a nozzle, jetting a gas to the melt to form droplets of the melt, and bringing the droplets into collision, before they solidify, against the surface of a rotating cooling member having the shape of a cone or horn and provided in the direction of the flow of the droplets, followed by rapid cooling to effect solidification, as disclosed in Japanese Laid-open Patent Application No. 1-319606, corresponding to U.S. Pat. No. 4,891,068. This publication discloses an aluminum alloy powder having the composition represented by the general formula: $Al_aM_bX_c$, wherein M represents one or more of metallic element(s) selected from the group consisting of V, Cr, Mn, Fe, Co, Ni, Cu, Zr, Ti, Mo, W, Ca, Li, Mg and Si; X represents one or more element(s) selected from the group consisting of Y, La, Ce, Sm, Nd, Hf, Nb, Ta and Mm (Misch metal); and a, b and c are $50 \leq a \leq 95$, $0.5 \leq b \leq 35$ and $0.5 \leq c \leq 25$ in atom %, respectively), and comprising a particle having a thickness of 0.1 to 5 μm, a minor axis of at least 5 μm and a major axis not more than 500 μm, an aspect ratio (which is the ratio of the major axis to the thickness) of not less than 5.

The above aluminum alloy powder comprises an amorphous phase or an amorphous and finely crystalline mixed phase, and hence it has the advantages that a superior corrosion resistance can be achieved, and less deterioration of reflecting properties may occur even when it is added to water-based coating materials.

This aluminum alloy powder comprising an amorphous phase or an amorphous and finely crystalline mixed phase, however, has relatively so high a specific gravity of the powder that it has the problem such that it can not be well dispersed when added as a pigment to a coating material to give a poor dispersibility when sprayed, and can not attain a sufficient hiding power of the material when mixed in a small quantity.

SUMMARY OF THE INVENTION

Accordingly, an object of the present invention is to provide an amorphous aluminum alloy powder having been improved in its dispersibility so that it can give superior hiding power and reflecting properties even when mixed in a small quantity.

The present inventors made extensive studies to achieve the above objects. As a result, they found that an amorphous aluminum alloy powder having a good dispersibility to a resin in a coating material, capable of achieving superior hiding power and reflecting properties and having superior orienting properties, coating film smoothness and reflecting properties can be obtained by further specifying the composition of the aluminum alloy and the particle shape of the powder. They have thus accomplished the present invention.

The aluminum alloy powder for coating materials, of the present invention is characterized by an aluminum alloy powder comprising an amorphous aluminum alloy consisting essentially of from 83 to 91% of Al, from 0.5 to 5% of Ca and from 8 to 12% of Ni, all in atom %, and comprising a leaf-shaped particle having a thickness of 0.3 to 3 μm, a minor axis of from 10 to 150 μm, a ratio of the minor axis to a major axis of from 1 to 3, and an aspect ratio which is the ratio of the minor axis to the thickness of from 3 to 100.

The coating material of the present invention is characterized by comprising a coating material resin component and the aluminum alloy powder described above.

The aluminum alloy powder for coating materials, of the present invention has been limited to comprise from 83 to 91% of Al, from 0.5 to 5% of Ca and from 8 to 12% of Ni, all in atom %, so that it can be comprised of an amorphous alloy and can achieve a very good corrosion resistance. Thus, it can be free from corrosion of particle surfaces and can achieve good reflecting properties, even when added in a water-soluble solvent coating material.

Incorporation of Ca in the composition can make reduce the specific gravity of the powder to make it approximate the specific gravity (from about 1.0 to 1.2) of the resin in the coating material, so that the dispersibility can be improved. As a result, the dispersibility in spraying can be improved and also the hiding power can be improved even when the powder is mixed in a small quantity. Thus, compared with the aluminum alloy powder as disclosed in the Japanese Laid-open Patent Application No. 1-319606, the powder of the present invention can achieve a more improved reflectance if the both are mixed in the same quantity.

Moreover, since its particle shape is specified as described above, the powder, when added to a coating material and the coating material is applied, can give good orienting properties and a superior hiding power attributable to the leafing phenomenon, so that the surface to be coated can be uniformly covered with the powder. As a result, the coated surface thus obtained can show a superior weatherability, corrosion resistance, reflecting properties and smoothness, and can provide a good appearance required as a decorative coating. Since also the powder has a small particle thickness, a coating film can be formed which can not be easily cracked against stress such as surface strain.

Namely, the aluminum alloy powder of the present invention has a specific composition and a particle shape, is amorphous and has a small specific gravity, and hence can give a good dispersibility when mixed in coating materials, can make the leafing phenomenon occur in a good state when the coating material is applied, and can attain a superior hiding power to give a coating film with a high reflectance even when mixed in a small quantity.

DESCRIPTION OF THE PREFERRED EMBODIMENTS

Figure 1:
FIG. 1 is a scanning electron microscope photograph of 200 magnifications of an aluminum alloy powder obtained according to an example of the present invention.

The aluminum alloy powder for coating materials, of the present invention comprises an amorphous aluminum alloy consisting essentially of from 83 to 91% of Al, from 0.5 to 5% of Ca and from 8 to 12% of Ni, all in atom %, and comprising a particle having a thickness of 0.3 to 3 $\mu$m, a minor axis of from 10 to 150 $\mu$m, a ratio of the minor axis to a major axis of from 1 to 3, and an aspect ratio which is the ratio of the minor axis to the thickness of from 3 to 100.

In the above composition of the aluminum alloy, Ca is an element indispensable for making the alloy amorphous. Its use in an amount less than 0.5 atom % makes it difficult to make the alloy amorphous, and its use in an amount more than 5 atom % may result in an excessively high viscosity to make it difficult for the alloy to be formed into powder. The Ca may more preferably be contained in an amount ranging between 1.0 atom % and 4 atom %. Ni also is an element indispensable for making the alloy amorphous. Its use in an amount less than 8 atom % makes it difficult to make the alloy amorphous, and its use in an amount more than 12 atom % may cause an increase in viscosity and at the same time an increase in density. The Ni may more preferably be contained in an amount ranging between 9 atom % and 11 atom %. Thus, the composition as specified in the present invention can bring about the amorphous aluminum alloy powder and also bring about a powder with a small specific gravity.

The reason why the shape of the powder particle is limited will be described below. The thickness of a powder particle is limited to from 0.3 to 3 $\mu$m for the reasons that a thickness less than 0.3 $\mu$m tends to cause occurrence of holes or the like in the powder particle and a thickness more than 3 $\mu$m may result in a lowering of the hiding power when coated. The minor axis of the powder particle is limited to from 10 to 150 $\mu$m for the reasons that a minor axis smaller than 10 $\mu$m may make poor the orienting properties of the powder and a minor axis larger than 150 $\mu$m may result in a poor spray coating performance. The ratio of the minor axis to the major axis is limited to from 1 to 3 for the reasons that an excessively large major axis may result in a poor hiding power even though the powder particle can be round or elliptic. Hence, its upper limit is set to 3. The aspect ratio which is the ratio of the minor axis to the thickness is limited to from 3 to 100 for the reasons that the orienting properties can be improved when the coating material is applied, and the hiding power can be improved.

The aluminum alloy powder of the present invention can be prepared using the aluminum alloy having the above composition, by the method as disclosed in the Japanese Laid-open Patent Application No. 1-319606 previously noted or the method as disclosed in Japanese Laid-open Patent Application No. 1-287209. More specifically, the method may comprise forcing a melt of the aluminum alloy composed as described above, to flow out from a nozzle, jetting a gas to the melt to form droplets of the melt, and bringing the droplets into collision, before they solidify, against the surface of a rotating cooling member having the shape of a cone or horn and provided in the direction of the flow of the droplets, followed by rapid cooling to effect solidification.

Figure 2:
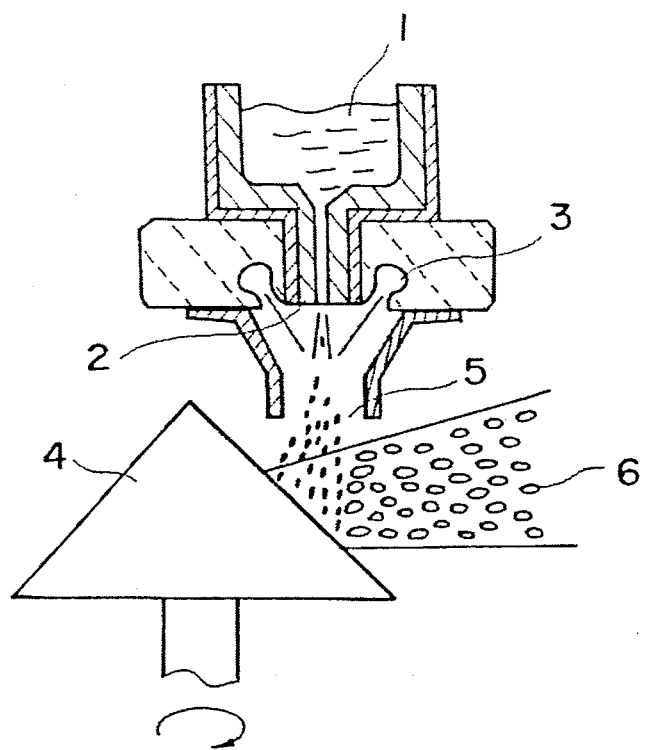
FIG. 2 is a cross section schematically illustrating an example of the apparatus for preparing the aluminum alloy powder of the present invention.

FIG. 2 illustrates an example of an apparatus for preparing the aluminum alloy powder for coatings, of the present invention.

There is provided a nozzle 2 from which a melt 1 of an aluminum alloy melted in a crucible is forced to flow out, and is also provided an atomizing nozzle 3 from which a high pressure jet gas is sprayed against the melt 1 dropping. The atomizing nozzle 3 is provided, for example, in a circular form so as to surround the nozzle 2, and has the structure that a high-speed gas is jetted from a number of jet outlets toward the flow of the melt 1. Beneath the nozzle, a cone type rotating cooling member 4 is so provided that its rotating shaft is at the position a little shifted to the side direction from right beneath the nozzle 2.

Thus, the high-pressure jet gas is sprayed from the atomizing nozzle 3 against the flow of the melt 1 that flows out from the nozzle 2 and drops, whereby droplets 5 of the melt are formed. The droplets 5 scatter while spreading downwards, collide against the inclined surface of the rotating cooling member 4 and are forced to have a flat particle shape, and solidified by rapid cooling, where leaf-shaped aluminum alloy powder particles 6 being circular or elliptic in their peripheral shapes are formed. In this example, a cone type member is used as the rotating cooling member 4. It is also possible to use a hone type member.

The gas may preferably be jetted from the atomizing nozzle 3 under a pressure of not less than 40 kg/cm$^2$. Usable as the gas are various gases such as argon, helium, nitrogen, air or a mixed gas of any of these. The rotating cooling member 4 may preferably be cooled to at least 50° C. or below by means of, for example, water cooling. The revolution number thereof may preferably be set to from 1,000 to 20,000 rpm.

The coating material of the present invention contains at least a coating material resin component and the aluminum alloy powder described above. In this instance, the aluminum alloy powder may be contained in an amount of preferably from 5 to 25 parts by weight, more preferably from 10 to 25 parts by weight, and most preferably from 10 to 20 parts by weight, based on 100 parts by weight corresponding to the total weight of the coating material resin component and aluminum alloy powder. Mixing the powder in an amount less than 5 parts by weight may make it impossible to well cover the coating surface with the powder, resulting in a poor effect of imparting the weatherability, corrosion resistance and reflecting properties. Mixing the powder in an amount more than 25 parts by weight is also not preferable because it may make poor the strength of coating films to cause occurrence of cracks or separation or to bring about a poor adhesion.

The coating material resin component may include various types of resins as exemplified by vinyl chloride resins, vinyl acetate resins, acrylic resins, polyurethane resins, epoxy resins and polyester resins, any of which can be arbitrarily used. The coating material may be either a water-soluble solvent coating material or an organic solvent coating material. In this instance, the aluminum alloy powder of the present invention has a superior corrosion resistance since it is amorphous, and hence can be well applied also to the water-soluble solvent coating material. The water-soluble solvent coating material may include, for example, emulsion coating materials making use of aqueous synthetic latex, and water-soluble resin coating materials.

In addition to the above coating material resin component and aluminum alloy powder, the coating material of the present invention can be optionally incorporated with a solvent, a hardening agent, a pigment, a thickening agent, a dispersant and a stabilizer which are used in commonly available coating materials. The solvent may be appropriately selected according to the type of the resin used. For example, organic solvents such as xylene, toluene, alcohol, acetone and ethyl acetate, or, in the case of the water-soluble resin, water may be used. There are no particular limitations on the type of the coating material, and the coating material may be of any type as exemplified by a solvent type, an emulsion type, a non-solvent type and a powder type.

The coating material of the present invention can be applied by various methods as exemplified by brushing and spraying. In this instance, in order for the aluminum alloy powder to be dispersed and well adhered, surface treatment may be carried out before the coating, using a surface treatment such as a surface active agent or a covering agent, or a surface modifier.

EXAMPLES

(1) PREPARATION OF ALLOY POWDERS

Using the apparatus as illustrated in FIG. 2, materials mixed in amounts giving an alloy powder having the compostion of 88% of Al, 2% of Ca and 10% of Ni in atom % were put in a crucible (since Ca undergoes a large dissolution loss, it was mixed in an amount 10% more than its amount in the composition of the resulting alloy powder when the material were mixed). After an argon atmosphere was set up, the materials were subjected to high-fequency melting at a temperature 150° C. higher than the melting temperature to make the melt 1.

The resulting melt 1 was flowed out and dropped from the nozzle 2, and argon gas was sprayed from the atomizing nozzle 3 against the dropping melt 1 under a pressure of 50 kg/cm² to form the droplets 5. The droplets 5 were brought into collision against a rotating cooling member having a roll diameter of 400 mm$\phi$, a cone angle of 60° and a revolution number of 5,000 rpm to obtain an aluminum alloy powder comprising a particle with a thickness of 0.8 to 2 $\mu$m, a minor axis of from 25 to 90 $\mu$m, a ratio of the minor axis to a major axis of 1 to 2 and an aspect ratio which is the ratio of the minor axis to the thickness of 10 to 100.

The crystal structure of the aluminum alloy powder thus obtained was examined with a diffractometer to confirm that it was amorphous. FIG. 1 shows a scanning electron microscope photograph of 200 magnifications of this alloy powder. As shown therein, powder particles are nicely elliptic in their peripheral shapes and were leaf-shaped with flat surfaces.

This alloy powder is designated as Example 1.

In the same manner and under the same composition as the above, prepared were amorphous aluminum alloy powders and crystal aluminum alloy powders with different thicknesses, minor axes, ratios of minor axes to major axes, and aspect ratios. These were respectively designated as Examples 2 and 3 and Comparative Examples 1 to 4. The structures and shapes of these alloy powders are shown later in Table 1 together with comparative data for coating film performances.

(2) PREPARATION OF COATING MATERIALS

Coating materials were prepared by mixing 85 vol. % of an acrylic resin and 15 vol. % of each of the metal powders obtained in the above. For the purpose of its application by spraying, a thinner was added in an appropriate amount to decrease viscosity.

(3) EVALUATION OF COATING FILM PERFORMANCE

Aluminum sheets of 1 mm in thickness, 70 mm in width and 150 mm in length were respectively coated with the above coating materials in a coating film thickness of about 50 $\mu$m. After dried, the state of the coating films were observed to examine the orienting properties of the powders in the coating films, the smoothness of the coating films and the hiding power in the coating films. At the same time, reflectance was measured and corrosion resistance was tested.

The reflectance was measured by the specular gloss measuring method as prescribed in JIS Z 8741-1983, using a measuring apparatus manufactured by Tokyo Denshoku K. K. and at an angle of 60°. The corrosion resistance was tested in the following way: Periferies of the aluminum sheets provied with the above coatings were sealed with epoxy resin. The test samples obtained were immersed in a aqueous 3% NaCl solution of 60° C. for 72 hours, and thereafter drawn up and washed. Their surfaces were observed with an optical microscope to examine whether or not white corrosion had been formed. Results obtained are shown in Table 1 (1-1 & 1-2).

TABLE 1-1

| | | Powder shape | | |
|---|---|---|---|---|
| Powder structure | Thickness (μm) | Minor axis (μm) | Minor axis/ major axis ratio | Aspect ratio |
| Example | | | | |
| 1  Amorphous | 0.8 to 2 | 25 to 90 | 1 to 2 | 10 to 100 |
| 2  Amorphous | 0.8 to 1.5 | 25 to 45 | 1 to 2 | 10 to 100 |
| 3  Amorphous | 1 to 2 | 90 to 150 | 1 to 3 | 10 to 100 |
| Comparative Example: | | | | |
| 1  Amorphous | 4 to 6 | 90 to 150 | 1 to 3 | 10 to 30 |
| 2  Amorphous | 1 to 2 | 25 to 90 | 3 to 5 | 10 50 80 |
| 3  Amorphous | 1 to 3 | 5 to 30 | 1 to 3 | 3 to 10 |
| 4  Crystalline | 0.8 to 2 | 25 to 90 | 1 to 2 | 10 to 100 |

TABLE 1-2

| | Coating film performances | | | |
|---|---|---|---|---|
| Orienting properties of powder in coating films | Coating film smoothness | Coating film reflectance | Hiding power in coating films | Corrosion resistance of powder itself (in aq. 3% NaCl solution) |
| Example | | | | |
| 1  Excellent | Good | 95 | Good | No corrosion |
| 2  Excellent | Good | 90 | Good | No corrosion |
| 3  Excellent | Good | 92 | Good | No corrosion |
| Comparative Example: | | | | |
| 1  Poor | Poor | 80 | Poor | No corrosion |
| 2  Poor | Poor | 40 | Poor | No corrosion |
| 3  Poor | Poor | 30 | Poor | No corrosion |
| 4  Excellent | Good | 30 | Good | Greatly corroded |

It is clear from the results shown in Table 1 that the aluminum alloy powders of Examples 1 to 3 are excellent in all the orienting properties of powder in coating films, the smoothness of coating films, the reflectance of coating films, the hiding power in coating films and the corrosion resistance of powder itself. On the other hand, the alloy powders of Comparative Examples 1 to 4 cause no corrosion in the case of amorphous powder, but show poor coating film performances and, in the case of crystalline powder, cause corrosion and show a low reflectance.

(4) COMPARISON OF ALLOY COMPOSITION

In the same manner as the $Al_{88}Ca_2Ni_{10}$ alloy powder obtained in the above (1), an $Al_{85}Ni_{7.5}Mm_{7.5}$ alloy powder comprised of 85% of Al, 7.5% of Ni and 7.5% of Mm (Misch metal) in atom % was prepared. Specific gravity of these powders was measured to reveal that it was 3.0 in respect of the $Al_{88}Ca_2Ni_{10}$ alloy powder, and 3.7 in respect of the $Al_{85}Ni_{7.5}Mm_{7.5}$ alloy powder.

These powders were each mixed in an acrylic resin in varied mixing ratios to prepare coating materials in the same manner as previously described. After coating films were formed, the hiding power was observed and the reflectance was measured.

Results obtained are shown in Table 2.

TABLE 2

| Alloy powder composition | Mixing ratio (w.w %) | Coating film performance | |
|---|---|---|---|
| | | Hiding power | Reflectance |
| $Al_{88}Ca_2Ni_{10}$ | 5 | Poor | 80 or more |
| $Al_{88}Ca_2Ni_{10}$ | 10 | Good | 90 or more |
| $Al_{88}Ca_2Ni_{10}$ | 15 | Good | 90 or more |
| $Al_{88}Ca_2Ni_{10}$ | 20 | Good | 90 or more |
| $Al_{88}Ca_2Ni_{10}$ | 25 | Good | 90 or more |
| $Al_{85}Ni_{7.5}Mm_{7.5}$ | 5 | Poor | 60 or more |
| $Al_{85}Ni_{7.5}Mm_{7.5}$ | 10 | Poor | 70 or more |
| $Al_{85}Ni_{7.5}Mm_{7.5}$ | 15 | Poor | 70 or more |
| $Al_{85}Ni_{7.5}Mm_{7.5}$ | 20 | Good | 80 or more |
| $Al_{85}Ni_{7.5}Mm_{7.5}$ | 25 | Good | 80 or more |
| $Al_{85}Ni_{7.5}Mm_{7.5}$ | 30 | Good | 80 or more |

It is clear from the results shown in Table 2 that the $Al_{88}Ca_2Ni_{10}$ powder of the present invention achieves a reflectance of 90 or more when mixed in an amount of 10 w/w % or more, and also shows a good hiding power. On the other hand, the $Al_{85}Ni_{7.5}Mm_{7.5}$ alloy powder achieves a reflectance of 80 or more and shows a good hiding power when mixed in an amount of 20 w/w % or more. Thus, the powder of the present invention can obtain a satisfactory reflectance and hiding power with its use in a smaller quantity.

What is claimed is:

1. An aluminum alloy powder for coating materials, comprising an amorphous aluminum alloy consisting essentially of from 83 to 91% of Al, from 0.5 to 5% of Ca and from 8 to 12% of Ni, all in atom %, and comprising a leaf-shaped particle having a thickness of 0.3 to 3 μm, a minor axis of from 10 to 150 μm, a ratio of the minor axis to a major axis of from 1 to 3, and an aspect ratio which is the ratio of the minor axis to the thickness of from 3 to 100.

2. The aluminum alloy powder of claim 1, wherein the powder particle is circular or elliptic in its peripheral shape.

3. The aluminum alloy powder of claim 1, wherein the Ca is present in an amount of 1.0 to 4 atom %.

4. The aluminum alloy powder of claim 3, wherein the Ni is present in an amount of 9 to 11 atom %.

5. The aluminum alloy powder of claim 4, wherein the leaf-shaped particle has a thickness of 0.8 to 2 μm, a minor axis of 25 to 90 μm, an aspect ratio of 10 to 100 and a ratio of the minor axis to the major axis of 1 to 2.

6. The aluminum alloy powder of claim 4, wherein the leaf-shaped particle has a thickness of 0.8 to 1.5 μm, a minor axis of 25 to 45 μm, an aspect ratio of 10 to 100 and a ratio of the minor axis to the major axis of 1 to 2.

7. The aluminum alloy powder of claim 4, wherein the leaf-shaped particle has a thickness of 1 to 2 μm, a minor axis of 90 to 150 μm an aspect ratio of 10 to 100 and a ratio of the minor axis to the major axis of 1 to 3.

8. A coating material comprising a coating material resin component and an amorphous aluminum alloy consisting essentially of from 83 to 91% of Al, from 0.5 to 5% of Ca and from 8 to 12% of Ni, all in atom %, and comprising a leaf-shaped particle having a thickness of 0.3 to 3 μm, a minor axis of from 10 to 150 μm, a ratio of the minor axis to a major axis of from 1 to 3, and an aspect ratio which is the ratio of the minor axis to the thickness of from 3 to 100, said aluminum alloy powder being contained in an amount of from 5 to 25 parts by weight based on 100 parts by weight of the total weight of (i) the coating material resin component and (ii) aluminum alloy powder, and said coating material resin component being at least one selected from the group consisting of a vinyl chloride resin, a vinyl acetate resin, an acrylic resin, a polyurethane resin, an epoxy resin and a polyester resin.

9. The coating material of claim 8, which further contains at least one selected from the group consisting of a solvent, a hardening agent, a pigment, a thickening agent, a dispersant and a stabilizer.

10. The coating material of claim 8, wherein the powder particle is circular or elliptic in its peripheral shape.

11. The coating material of claim 8, wherein the aluminum alloy powder is present in an amount of 10 to 25 parts by weight based on 100 parts by weight corresponding to the total weight of the coating material resin component and the aluminum alloy powder.

12. The coating material of claim 8, wherein the aluminum alloy powder is present in an amount of 10 to 20 parts by weight based on 100 parts by weight corresponding to the total weight of the coating material resin component and the aluminum alloy powder.

13. The coating material of claim 12, wherein the Ca is present in an amount of 1.0 to 4 atom % and the Ni is present in an amount of 9 to 11 atom %.

14. The coating material of claim 13, wherein the leaf-shaped particle has a thickness of 0.8 to 2 $\mu$m, a minor axis of 25 to 90 $\mu$m, an aspect ratio of 10 to 100 and a ratio of the minor axis to the major axis of 1 to 2.

15. The coating material of claim 13, wherein the leaf-shaped particle has a thickness of 0.8 to 1.5 $\mu$m, a minor axis of 25 to 45 $\mu$m, an aspect ratio of 10 to 100 and a ratio of the minor axis to the major axis of 1 to 2.

16. The coating material of claim 13, wherein the leaf-shaped particle has a thickness of 1 to 2 $\mu$m, a minor axis of 90 to 150 $\mu$m, an aspect ratio of 10 to 100 and a ratio of the minor axis to the major axis of 1 to 3.

17. The coating material of claim 8, wherein the resin component is an acrylic resin.

18. A coating material comprising a coating material resin component and an amorphous aluminum alloy consisting essentially of from 83 to 91% of Al, from 0.5 to 5% of Ca and from 8 to 12% of Ni, all in atom %, and comprising a leaf-shaped particle having a thickness of 0.3 to 3 $\mu$m, a minor axis of from 10 to 150 $\mu$m, a ratio of the minor axis to a major axis of from 1 to 8, and an aspect ratio which is the ratio of the minor axis to the thickness of from 3 to 100, wherein said aluminum alloy powder is contained in an amount of from 5 to 25 parts by weight based on 100 parts by weight of the total weight of (i) the coating material resin component and (ii) aluminum alloy powder, and said coating material resin component is selected from the group consisting of a water-based synthetic latex and a water-soluble resin.

19. The coating material of claim 18, which further contains at least one selected from the group consisting of a solvent, a hardening agent, a pigment, a thickening agent, a dispersant and a stabilizer.

20. The coating material of claim 18, wherein the powder particle is circular or elliptic in its peripheral shape.

* * * * *